May 5, 1959
E. J. SCANLON ET AL
2,885,580
GENERATOR STATOR CONSTRUCTION
Filed July 1, 1957
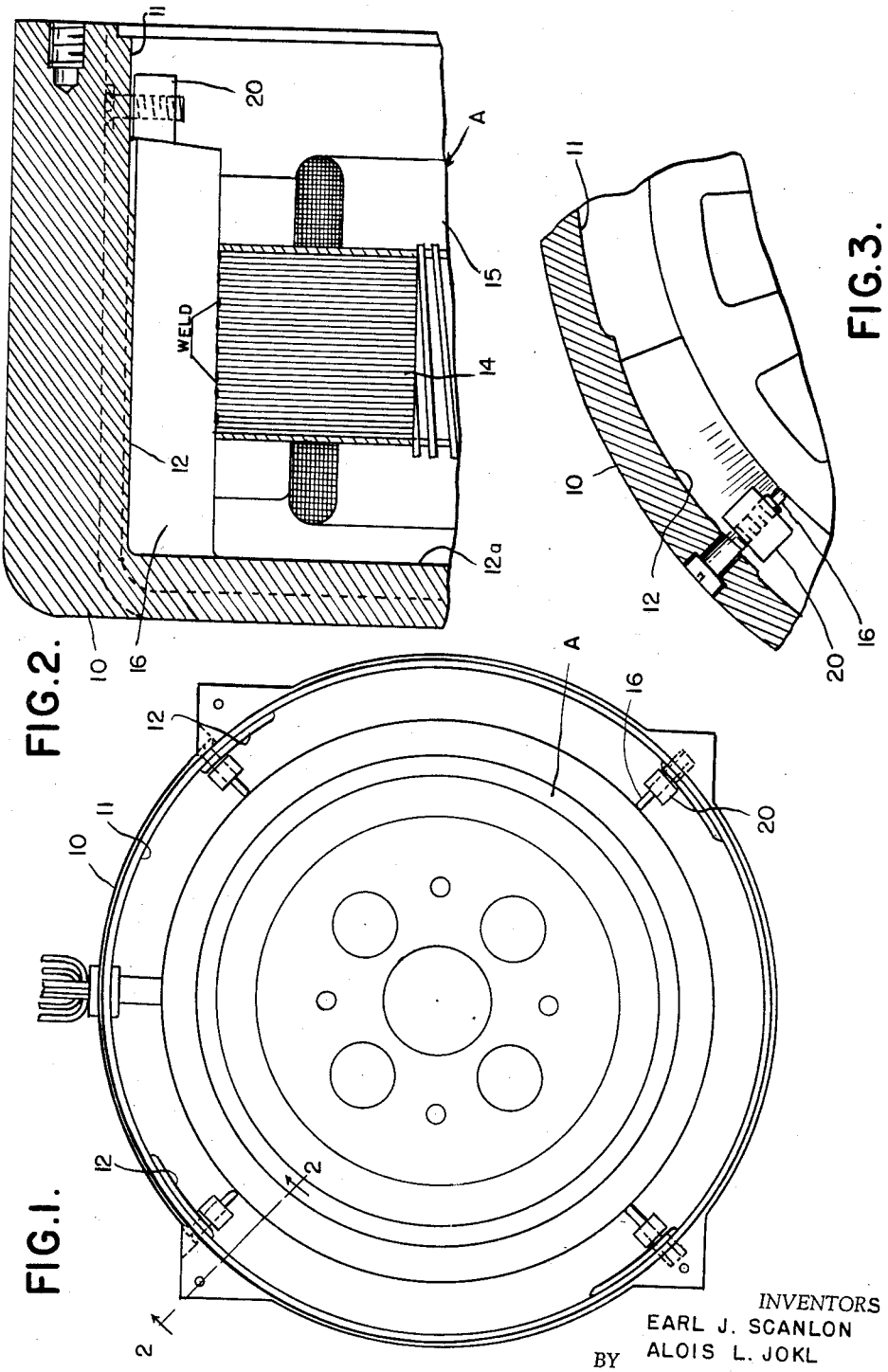
INVENTORS
EARL J. SCANLON
ALOIS L. JOKL
BY
*Hauke & Hardity*
ATTORNEYS United States Patent Office 2,885,580
Patented May 5, 1959

2,885,580

GENERATOR STATOR CONSTRUCTION

Earl J. Scanlon, Detroit, and Alois L. Jokl, Garden City, Mich., assignors to Continental Motors Corporation, Detroit and Muskegon, Mich., a corporation of Virginia Application July 1, 1957, Serial No. 669,278

4 Claims. (Cl. 310—258)

This invention relates to an electric generator and more particularly to a novel stator construction especially adapted for use in a high output small generator.

An object of the invention is to improve the overall generator efficiency by providing an improved stator construction for more accurately locating the stator winding assembly and to better secure same in the generator housing.

A further object of our invention is to facilitate the manufacture and maintenance of a generator by providing an improved stator construction embodying means providing an improved assembly resulting in more economical manufacture.

A more complete understanding of our invention may be had by reference to the accompanying drawings illustrating a preferred embodiment of our invention in which like characters refer to like parts throughout the several views, and in which—

Fig. 1 is an elevational view of a stator assembly showing the means for securing the stator winding assembly to the generator housing.

Fig. 2 is an enlarged vertical sectional view taken substantially on the line 2—2 of Fig. 1, and Fig. 3 is an enlarged fragmentary view of stator winding assembly securing means.

The generator housing 10 is drum shaped and exteriorly is substantially of standard construction. The stator winding assembly "A" is firmly secured to and precisely located within the housing, same being concentrically aligned and fixed to the inner annular wall of the housing drum.

Annularly spaced about the inner annular wall 11 of said housing are the arcuate bearing bosses 12 and the inner end face 12a of the drum is also machined to provide a face disposed in a plane normal to the axis. The stator winding assembly comprises the lamination assembly 14 having windings 15. The locking bars 16 are secured to the periphery of the lamination assembly, substantially equi-annularly spaced and are preferably welded or otherwise suitably attached to the lamination assembly 14, said bars being square at the inner end and machined to provide a sloping face at the outer end (see Fig. 2). These bars may be straight or skewed as desired, Fig. 3 showing skewed bars constructed to complementarily seat on the arcuate bosses 12.

A wedge 20 is adjustably secured to the rim of the housing and is constructed to engage the sloping end face of the bars to seat same on said bearing bosses and firmly abut the inner end face 12a of the housing.

It will be noted that these wedges 20 are preferably constructed to have a slight clearance with respect to the inner annular drum when the bars are firmly seated.

It will thus be observed that this construction provides means which accurately locate and center the stator winding assembly within the generator housing by reason of the clamping of the locking bars firmly to the housing, all such assembly being accomplished with a minimum of labor.

We claim:

1. An electric generator stator comprising a drum type housing having an end wall and a plurality of angularly spaced internal peripherically disposed bearing bosses, a stator core adapted for assembly in said housing and having a plurality of angularly spaced bars secured to the outer periphery of said stator core, and means for locating and securing said stator core in said housing and comprising a plurality of adjustable wedge blocks carried by said housing, each wedge block engaging the outer end of one of said bars, said bars being urged inwardly by said wedge blocks into contact with the end wall of said housing and being seated on the bearing bosses peripherally disposed in said housing.

2. An electric generator stator comprising a drum type housing having an end wall and a plurality of angularly spaced internal peripherally disposed bearing bosses, a stator core adapted for assembly in said housing and having a plurality of angularly spaced bars secured to the outer periphery of said stator core, and means for locating and securing said stator core in said housing and comprising a plurality of adjustable wedge blocks carried by said housing, each wedge block engaging the outer end of one of said bars, said bars being urged inwardly by said wedge blocks into contact with the end wall of said housing and being seated on the bearing bosses peripherally disposed in said housing, said bearing bosses each having an arcuate inner surface, each of said bars being disposed in an angular skewed relation with respect to the axis of the generator housing and having an arcuate outer surface seating on the arcuate inner surface of one of said bearing bosses.

3. An electric generator stator comprising a drum type housing having an end wall and a plurality of angularly spaced internal peripherally disposed bearing bosses, a stator core adapted for assembly in said housing and having a plurality of angularly spaced bars secured to the outer periphery of said stator core, and means for locating and securing said stator core in said housing and comprising a plurality of adjustable wedge blocks carried by said housing, each wedge block engaging the outer end of one of said bars, said bars being urged inwardly by said wedge blocks into contact with the end wall of said housing and being seated on the bearing bosses peripherally disposed in said housing, the end wall of said housing having a machine finished inner face disposed normal to the housing axis, the inner ends of said bars having machine finished faces disposed in a common plane normal to the housing axis whereby to seat on the inner face of said housing end wall, and the outer ends of said bars having inclined end faces for complementary engagement with said wedge blocks.

4. An electric generator stator comprising a drum type housing having an end wall and a plurality of angularly spaced internal peripherally disposed bearing bosses, a stator core adapted for assembly in said housing and having a plurality of angularly spaced bars secured to the outer periphery of said stator core, and means for locating and securing said stator core in said housing and comprising a plurality of adjustable wedge blocks carried by said housing, each wedge block engaging the outer end of one of said bars, said bars being urged inwardly by said wedge blocks into contact with the end wall of said housing and being seated on the bearing bosses peripherally disposed in said housing, the end wall of said housing having a machine finished inner face disposed normal to the housing axis, the inner ends of said bars having machine finished faces disposed in a common plane normal to the housing axis whereby to seat on the inner face of said housing end wall, and the outer ends of said bars having inclined end faces for complementary engagement with said wedge blocks, said wedge blocks being radially adjustable relative to said housing axis and disposed to have a clearance with respect to the inner peripheral surface of said housing when adjusted into firm abutting engagement with the outer end faces of said bars.

References Cited in the file of this patent

UNITED STATES PATENTS

| 167,572 | Seaver | Sept. 7, 1875 |
| 1,033,379 | Burke | July 23, 1912 |
| 2,430,613 | Hodge | Nov. 11, 1947 |

FOREIGN PATENTS

| 621,568 | Great Britain | Mar. 3, 1947 |